(12) United States Patent
Walter et al.

(10) Patent No.: US 8,290,814 B2
(45) Date of Patent: *Oct. 16, 2012

(54) SELF-CHECKOUT SYSTEM HAVING MINIMAL FOOTPRINT

(75) Inventors: Joanne Walter, Alpharetta, GA (US); James Morrison, Suwanee, GA (US); Horng Jaan Lin, Lawrenceville, GA (US)

(73) Assignee: NCR Corporation, Duluth, GA (US)

( * ) Notice: Subject to any disclaimer, the term of this patent is extended or adjusted under 35 U.S.C. 154(b) by 1823 days.

This patent is subject to a terminal disclaimer.

(21) Appl. No.: 11/290,353

(22) Filed: Nov. 30, 2005

(65) Prior Publication Data
US 2006/0080177 A1    Apr. 13, 2006

Related U.S. Application Data

(63) Continuation of application No. 10/025,943, filed on Dec. 26, 2001, now Pat. No. 6,990,463.

(51) Int. Cl.
*G06Q 20/00* (2006.01)

(52) U.S. Cl. ............... 705/16; 705/17; 186/61; 186/66; 186/36; 186/37; 235/383; 235/462; 235/385

(58) Field of Classification Search ............ 705/16
See application file for complete search history.

(56) References Cited

U.S. PATENT DOCUMENTS

| | | |
|---|---|---|
| 5,437,346 A | 8/1995 | Dumont |
| 5,494,136 A | 2/1996 | Humble |
| 5,500,640 A | 3/1996 | Zhou et al. |
| 5,641,039 A | 6/1997 | Dumont |
| 5,747,784 A | 5/1998 | Walter et al. |
| 5,831,220 A | 11/1998 | Ramsden et al. |
| 5,992,570 A | 11/1999 | Walter et al. |
| 6,105,014 A | 8/2000 | Ramsden et al. |
| 6,296,185 B1 | 10/2001 | Dejaeger |
| 6,304,223 B1 | 10/2001 | Hilton et al. |
| 6,354,496 B1 | 3/2002 | Murphy et al. |
| 6,354,497 B1 | 3/2002 | Lippert et al. |
| 6,390,363 B1 | 5/2002 | Morrison et al. |
| 6,497,362 B2 | 12/2002 | Persky et al. |
| 6,550,582 B2 | 4/2003 | Addy et al. |
| 6,598,790 B1 | 7/2003 | Horst |
| 6,598,791 B2 | 7/2003 | Keys et al. |

(Continued)

OTHER PUBLICATIONS

Gatlin, Greg. New concept checks out; Self-scanning reduces lines; Personal scanning checks out. Jan. 25, 1999. Boston Herald, p. 27.*

*Primary Examiner* — F. Zeender
*Assistant Examiner* — Fawaad Haider
(74) *Attorney, Agent, or Firm* — Paul W. Martin (57) ABSTRACT

A self-checkout system, particularly for retail areas of constrained floor space, has a small to zero footprint while being fully functional. In one form, the self-checkout comprises a unit mountable to a wall, pillar, or other support. In another form, the self-checkout has or is part of a columnar support. The self-checkout system has security in the form of video and weight verification. A visual and/or audio indicator provides indicia of modes of use of the self-checkout. The self-checkout further includes an interactive customer interface terminal, a scanner, and a scale. The self-checkout provides an open visual area that allows easy viewing by store personnel of transactions being performed on the self-checkout system.

10 Claims, 7 Drawing Sheets

U.S. PATENT DOCUMENTS

| | | |
|---|---|---|
| 6,779,722 B1 | 8/2004 | Mason |
| 6,837,428 B2 | 1/2005 | Lee et al. |
| 2002/0079367 A1 | 6/2002 | Montani |
| 2002/0123932 A1 | 9/2002 | Brenhouse |
| 2003/0001007 A1 | 1/2003 | Lee et al. |
| 2003/0018522 A1 | 1/2003 | Denimarck et al. |
| 2003/0018897 A1 | 1/2003 | Bellis et al. |
| 2003/0115103 A1 | 6/2003 | Mason |

\* cited by examiner

SELF-CHECKOUT SYSTEM HAVING MINIMAL FOOTPRINT

This application is a continuation of co-pending application Ser. No. 10/025,943, filed on Dec. 26, 2001, the disclosure of which is hereby totally incorporated by reference in its entirety.

BACKGROUND

1. Field of the Invention

The present invention relates generally to self-service checkout systems for retail businesses and, more particularly, to a self-service checkout system configured to have a small to zero footprint.

2. Background Information

Many general merchandise stores and an increasing number of retail grocery, supermarket, or food stores utilize self-service checkout or self checkout systems typically in addition to regular assisted checkouts. These self-checkout systems allow a customer to perform purchase transactions or checkout transactions without the assistance of a clerk or other store personnel. While such self-checkout systems are generally efficient, such self-checkout systems take up a lot of floor space.

With typical grocery stores, retail stores, and superstores, there is typically plenty of floor space for checkout. However, in retail stores such as drugstores and the like, there is typically minimal floor space. Such minimal floor space thus makes the available floor space at a premium. Such places where floor space is at a minimum (or at a premium) cannot justify a conventional self-checkout with a large footprint.

It would thus be advantageous to have a fully functional self-checkout that alleviates the size problems of the past.

What is therefore needed is a self-service checkout system that overcomes one or more of the above-mentioned drawbacks. What is particularly needed is a self-service checkout system that can be used in minimum space applications.

What is more particularly needed is a self-service checkout system or terminal that has a small to zero footprint.

SUMMARY

The subject invention is a self-service checkout having a zero to small footprint. The self-checkout of the subject invention provides the necessary components to provide the same features and/or functionality as a typical large footprint self-checkout. In this manner, the subject self-checkout has vertically oriented components.

In one form, the subject invention is a self-checkout that includes a housing, an interactive customer interface terminal supported by the housing and operative to process a purchase transaction, and a scale supported by the housing and in communication with the interactive customer interface terminal, the scale being operative to obtain weight. The interactive customer interface terminal and the scale are vertically oriented with respect to each other on the housing.

In another form, the subject invention is a self-checkout having a housing, an interactive customer interface terminal supported by the housing and operative to facilitate a purchase transaction with a customer on the self-checkout, a security scale supported by the housing and in communication with the interactive customer interface terminal, the security scale operative to obtain weight during the purchase transaction, and a security camera supported by the housing and in communication with the interactive customer interface terminal, the security camera operative to obtain video of an aspect of the purchase transaction. The security scale is oriented vertically below the interactive customer interface terminal on the housing.

In still another form, the subject invention is a zero footprint self-checkout having a housing configured to be mounted onto a support structure above a floor on which the support structure extends, an interactive customer interface terminal supported by the housing and oriented to face a customer, and a scale supported by the housing and in communication with the interactive customer interface terminal, the scale disposed vertically below the interactive customer interface terminal.

It is therefore an object of the subject invention to provide a new and useful self-service checkout system.

It is moreover an object of the subject invention to provide an improved self-service checkout system.

The above and other objects, features, and advantages of the subject invention will become apparent from the following description and the attached drawings.

BRIEF DESCRIPTION OF THE DRAWINGS

Corresponding reference characters indicate corresponding parts throughout the several views.

DETAILED DESCRIPTION OF THE INVENTION

Figure 1:
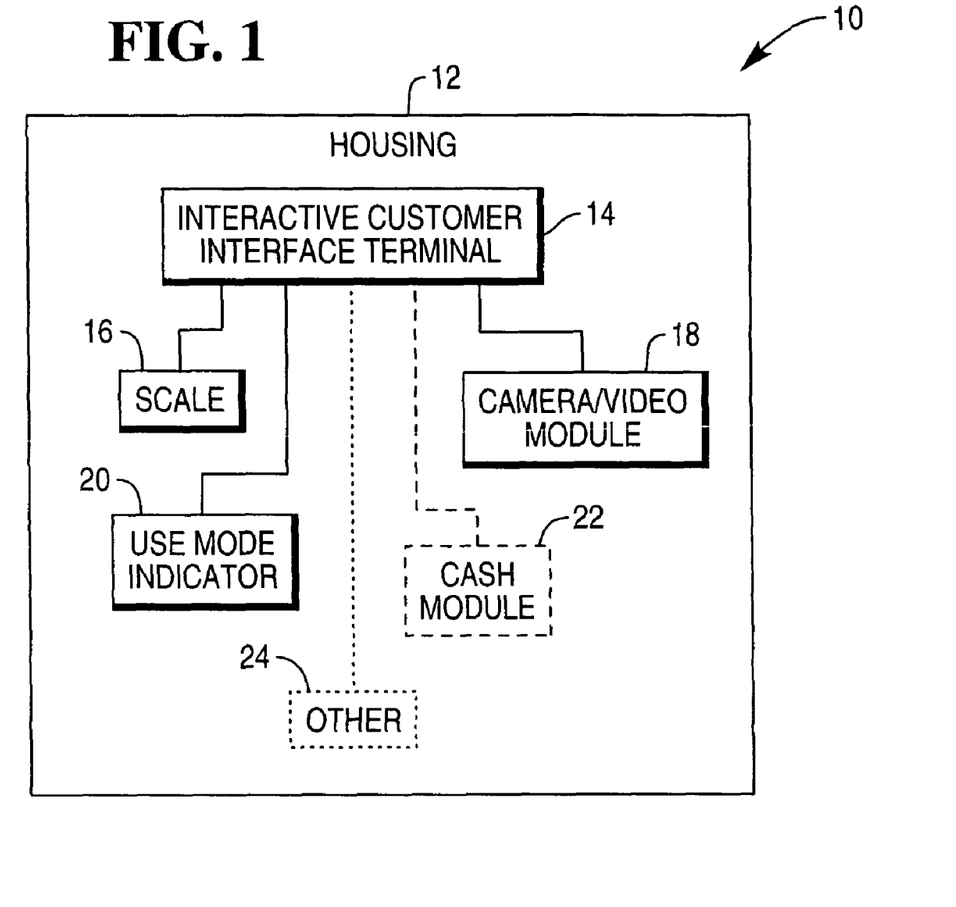
FIG. 1 is a block diagram of an illustrative self-checkout system in accordance with the principles of the subject invention.

Referring to FIG. 1, there is depicted a block diagram of a self-service checkout or self-checkout (SCO) system or terminal generally designated 10 in accordance with the principles of the subject invention. The self-checkout system 10 includes a housing 12 that supports/has an interactive customer interface terminal (ICIT) 14, a scale 16, a camera/video module 18, and a use mode indicator 20. Optionally, the housing 12 may additionally support/have a cash module 22 and other components 24.

The housing 12, in general, is configured to have a small footprint (i.e. the amount of floor space occupied or on which the housing sets) to a zero footprint (i.e. no part of the housing sets on the floor). The small to zero footprint of the housing, and thus the SCO 10, allows the SCO 10 to be well suited for retail stores where space is at a minimum and/or at a premium. The housing 12 supports the interactive customer interface terminal 14 preferably by being mounted thereon or in a manner that allows easy access to and use of the interactive customer interface terminal 14 by a consumer. As explained more fully below, the interactive customer interface terminal 14 provides, at a minimum, instructions and/or data from the retail establishment to the customer, allows customer input of various choices and customer data, scans or obtains machine-readable indicia from an item, and obtains/assists in receipt of payment from the customer.

The scale 16 is in communication with the interactive customer interface terminal 14 and is operative to obtain a weight of an item or items placed thereon. Particularly, the scale 16 is operative to obtain the weight of items (cumulative weight of items) during the purchase transaction. More particularly, the scale 16 is operative to obtain the cumulative weight of items placed thereon, preferably within a bag or the like. The scale 16 provides a security check of items bagged against those items scanned.

The camera/video module 18 is in communication with the interactive customer interface terminal 14 and is operative to obtain still pictures and/or (real-time) video (hereinafter, collectively "video") of the purchase transaction being performed at the SCO system 10. The camera/video module 18 may obtain video of the customer, the scanning process, the bagging process, the weighing process, the payment process, and more. The camera/video module 18 may utilize a digital or analog camera that is configured to take still pictures and/or real-time video.

The SCO system 10 also includes a use mode indicator 20 that is in communication with the interactive customer interface terminal 14. The use mode indicator 20 is operative to indicate and/or provide indicia of whether the SCO 10 is currently in use (currently being used) by a customer. The use mode indicator 20 may be audible, visual, or a combination of audible and visual signals. The use mode indicator 20 may also utilize any of the above to indicate non-use. A non-use indicator 20 could be provided after a predetermined period of time has elapsed since an event, or upon the occurrence of a particular event.

The SCO system 10 may optionally have (indicated by the dashed lines thereof) a cash module 22. The cash module would be similar to typical self-checkout cash modules, such as those manufactured by NCR Corporation of Dayton, Ohio, and be operative to accept and dispense cash as payment for a purchase transaction. The SCO system 10 may further optionally have other 24 components deemed inherent or otherwise fully encompassed (and indicated as such by the dashed lines).

The SCO system 10 is operative to allow purchase transactions to be performed or conducted thereon. Additionally, the SCO system 10 is operative to monitor the purchase transactions by item weight and video security measures. The SCO system 10 is configured to perform a number of retail functions, particularly unassisted or "self-service" checkout functions. What is meant herein by the term "self-service checkout functions" or "self-service checkout transaction" or "self-service purchase transaction" are those checkout functions or transactions that are performed by a checkout system by the customer himself or herself without the assistance of a clerk or other personnel employed by the retailer. For example, a self-service checkout (purchase) function or transaction would be performed on the SCO system 10 in response to a customer himself or herself scanning or otherwise entering items for purchase into the checkout system, and thereafter depressing a payment key on the interactive customer interface terminal 14 that indicates the manner by which the customer intends to pay for such items (e.g. by interaction with a credit/debit/smart card reader and/or currency acceptor). Accordingly, what is meant herein by self-service mode of operation is the configuration of the SCO system 10 that allows it to perform a self-service checkout (purchase) function or transaction.

In addition, what is meant herein by the term "customer" or "consumer" (in the context of the subject invention) is a person who enters a retailer's store, selects his or her items for purchase from the shopping area of the store, checks out his or her items for purchase at a checkout system such as the SCO system 10 (including tendering payment for his or her items for purchase), and then exits the store subsequent to tendering payment. Hence, as used herein, a customer or consumer is distinguished from retail personnel such as a checkout clerk or other employee of the retailer in that a customer or consumer enters the retailer's store for the purpose of purchase items from the store. Moreover, what is meant herein by the term "retail personnel" is a person that is employed by the retailer to perform a retail activity such as operation of a monitoring station for the video 18 or the like (not shown) or assistance in operation or other function of the SCO system 10. Also, the term "user" is herein used to refer to any operator of the SCO system 10. Accordingly, a user may be retail personnel, a customer or consumer, or any other person who operates the SCO system 10.

The SCO system 10 further includes the interactive customer interface terminal (ICIT) 14. The ICIT 14 provides various functions for the SCO system 10. In one form, the ICIT 14 provides the main processing for the various components and software of the SCO system 10. The ICIT 14 also provides the main interaction between the customer and the SCO system 10. Further, the ICIT 14 provides functionality for the SCO system 10, such as scanning, payment acceptance, input/output device, and information/data terminal.

Figure 2:
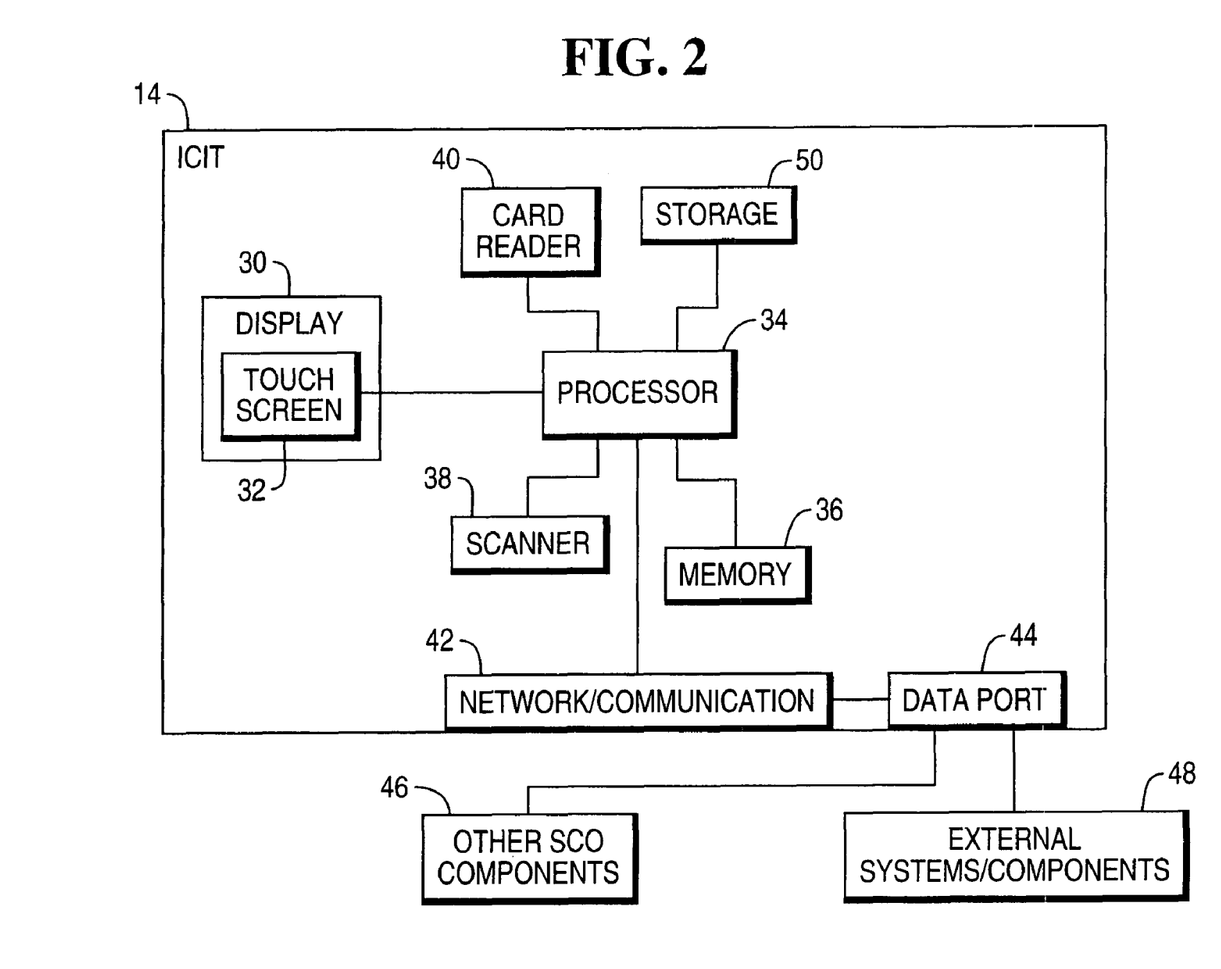
FIG. 2 is a simplified block diagram of the interactive customer interface terminal of the illustrative self-checkout system of FIG. 1.

Referring to FIG. 2, the ICIT 14 is shown as a block diagram. The ICIT 14 is a user interface terminal or interactive customer interface terminal for receiving input from and providing information to a customer. The ICIT 14 includes a processor 34 (processor, processing unit, processing logic and/or the like and necessarily associated components) as a main processing unit. As such, the processor 34 is representative of any manner of providing electronic processing logic for processing and/or performing the various features, functionality, and the like on the SCO system 10. Memory 36 is provided that is in communication with the processor 34. Program instructions (software) for the operation of the SCO system 10 as set forth herein are stored in the memory 36. The memory 36 may be any type of available memory including RAM, ROM, EEPROM, DRAM, and/or the like depending on the particular application and functionality.

The interactive customer interface terminal 14 includes a display/monitor 30 that is provided to display retail information to the customer during operation of the SCO system 10. For example, transaction information such as item price, item description, total amount of the transaction, instructions, etc. may be displayed to the customer via the display/monitor 30 during operation of the SCO system 10. Moreover, instructions are displayed on the display/monitor 30 that assist or otherwise guide the customer through operation of the SCO system 12. The display/monitor 30 may be an LCD, TFT, or other type of, preferably, flat panel technology.

Additionally, customer-specific messages may be displayed to the customer on the display/monitor 30 at certain times during a checkout transaction. What is meant herein by the term "customer-specific" in regard to messages is a retail message that is customized for a given customer based on the purchasing habits or other information that is unique to the customer. For example, a customer-specific message may include a customer-specific advertisement that advertises a product that was purchased by the customer during a previous visit to the retailer's store. The SCO system 10 is configured to retrieve information from a customer profile database that contains information about each of the retailer's customers. Moreover, a customer-specific message may include a customer-specific advertisement that advertises a product that may be used in conjunction with a product that was previously scanned or otherwise entered into the SCO system 10 during the current checkout transaction.

The display/monitor 30 of the interactive customer interface terminal 14 preferably incorporates or includes a touch screen or touch screen monitor 32 that can generate data signals when certain areas of the screen are touched by a customer. The touch screen 32 may encompass the entire display area of the display/monitor 30 or may cover only a portion thereof. Hence, the display/monitor 30 may be utilized by the customer to input information into the SCO system 10 either at the request of the SCO system 10 (as a response to a question or next action to be taken) or at the motivation of the customer. For example, the customer may manually enter retail information such as item (bar or UPC) codes and quantities into the SCO system 10 by use of the touch screen 32 associated with the display/monitor 30. The customer may indicate his or her preferred method of payment (e.g. cash, credit card, or debit card) and/or PIN number by touching the appropriate area of the touch screen 32 associated with the display/monitor 30. A portion of the touch screen 32 associated with the display/monitor 30 may also be used as a signature capture area wherein a stylus (not shown) may be used to input the signature of a customer in the case of a card purchase or other type of purchase requiring a signature. The display/monitor 30 may provide pictures, video, data, and/or other information (collectively data) to the customer during the checkout transaction as appropriate or desired. This data may require responses or actions by the customer that are implemented via the ICIT 14 or may require only passive viewing.

The ICIT 14 also includes a scanner 38 that is in communication with the processor 14. The scanner 38 is operative to conventionally scan or read a product identification code such as a Universal Product Code (UPC), industrial symbol(s), alphanumeric character(s), or other indicia associated with an item to be purchased. One scanner that may be used in the subject invention is commercially available from NCR Corporation of Dayton, Ohio. The scanner 38 is preferably integral with the ICIT 14 but may be provided separately.

The scanner 38 includes a light source (not shown) such as a laser, a rotating mirror (not shown) driven by a motor (not shown), and a mirror array (not shown) such as is conventional in the art. In operation, a laser beam from the laser reflects off the rotating mirror and mirror array to produce a pattern of scanning light beams. As the machine-readable indicia on an item is passed over in front of the scanner 38, the scanning light beams scatter off the product identification code and are returned to the scanner 38 where they are collected and detected. The reflected light is then analyzed electronically in order to determine whether the reflected light contains a valid indicia pattern. If a valid indicia pattern is detected or present, the machine-readable indicia (e.g. a product identification code) may then be utilized to retrieve product information/data associated with the item (e.g. the price of the item, product description, or the like). The scanner 38 may also be used to read various information to perform various other functions.

The ICIT 14 may further include network or communications logic 42 that is in communication with the processor 34 and with a data port 44. The data port allows the ICIT 14 to be in communication with other SCO system components, represented by the box 46, and external systems and/or components, represented by the box 48, as necessary or appropriate. The data port 44 may also provide a diagnostics port and/or other ports as necessary and/or appropriate. The network/communications 42 is thus operative to provide the necessary interface with other SCO system components and external components as may be necessary.

The ICIT 14 also includes a card reader 40 that is operative to obtain data and/or information from a credit, debit, smart card or the like. This includes magnetic and/or electronic reading capabilities. Information obtained by the card reader 40 is typically used for payment, but may also magnetically or electronically read bonus or store cards, gift cards, and/or the like. The processor 34 processes the information obtained by the card reader 40 accordingly.

Figure 3:
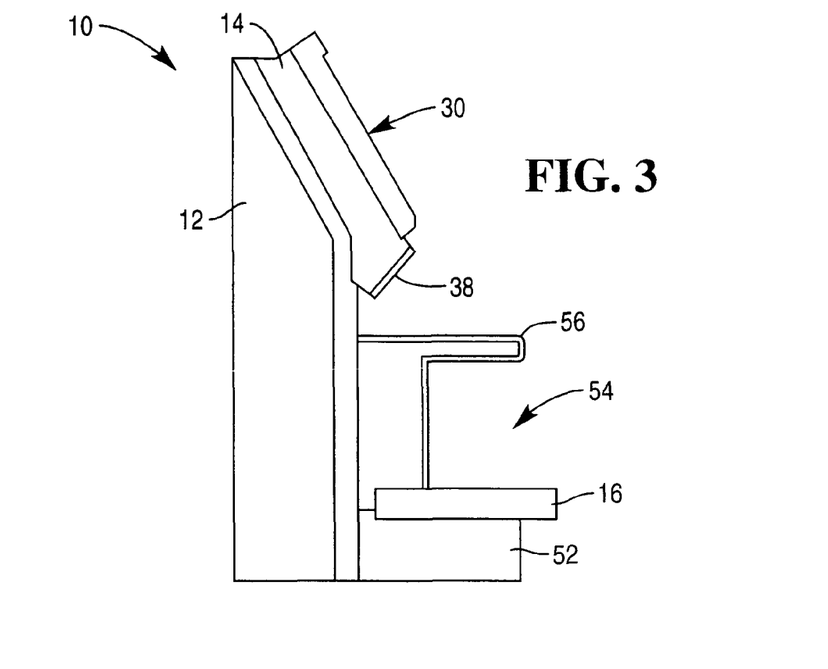
FIG. 3 is a side elevation view of an exemplary embodiment of a self-checkout in accordance with the principles of the subject invention.
Figure 4:
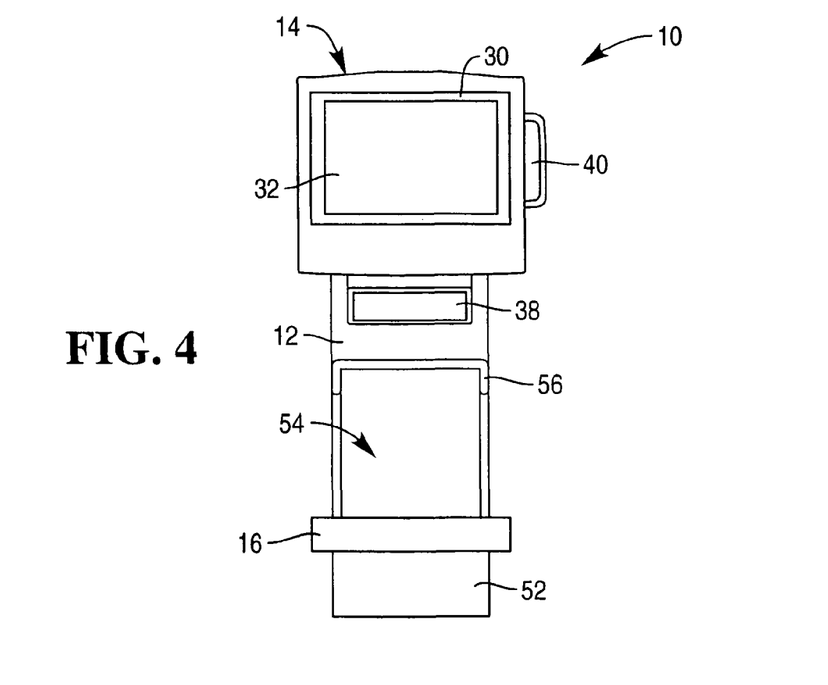
FIG. 4 is a front elevation view of the self-checkout of FIG. 3.

Referring to FIGS. 3 and 4, there is depicted an exemplary embodiment of the SCO system 10. The SCO system 10 includes a housing 12 that forms an essentially elongated, vertically oriented, rectangular body. Preferably, the housing 12 is approximately about thirty-six inches (36") to forty-eight inches (48") in height. This provides a compact yet ergonomically efficient size for consummating purchase transactions. Such accommodates purchase transactions of smaller items and/or quantities. The housing size also allows the SCO system 10 to be mounted on a structure.

The SCO system 10 has the ICIT 14 mounted on a top portion of the housing 12. The ICIT 14 is oriented at an angle relative to a vertical defined through the longitudinal length of the housing 12. The angle of the ICIT 14 is such as to allow the viewer to easily view the display/monitor 30. Preferably, the angle of the display/monitor 14 is fixed, but may be adjustable. Such adjustability would allow a customer to change the viewing angle of the display/monitor 30 within a particular range of viewing angles.

In the SCO system 10 of FIGS. 3 and 4, the ICIT 14 integrally includes the scanner 38 at a bottom thereof. The scanner 38 is preferably oriented towards a bagging area 54. The bagging area 54 includes the scale 16 that is supported on a scale shelf 52. The scale shelf 52 extends from a bottom of the housing 12. Since in this case, the scanner 38 is integral with the ICIT 14, any adjustability must be limited to allow the scanner 38 to always be properly oriented to scan an item. The ICIT 14 also includes the card reader 40 on a side thereof. This position serves to facilitate easy access and/or use of the card reader 40 by the customer.

The SCO system 10 also includes a bag rail 56 that aids in retaining a bag or container on the scale 16. The bag rail 56 may also hold a plurality of bags (not shown), such as plastic bags, for use by the customer. The bagging area 54 is formed to allow the scale 16 and scale area to be open and not be blocked. This provides a wide viewing area for the purchase transaction.

It can be seen that the various components, (e.g. the ICIT 14 and the scale 16) are vertically oriented with respect to each other along the housing 12. The vertical arrangement of the components of the SCO system 10 and the size and/or style of the housing provides an exemplary embodiment of a zero-footprint self-checkout.

Figure 5:
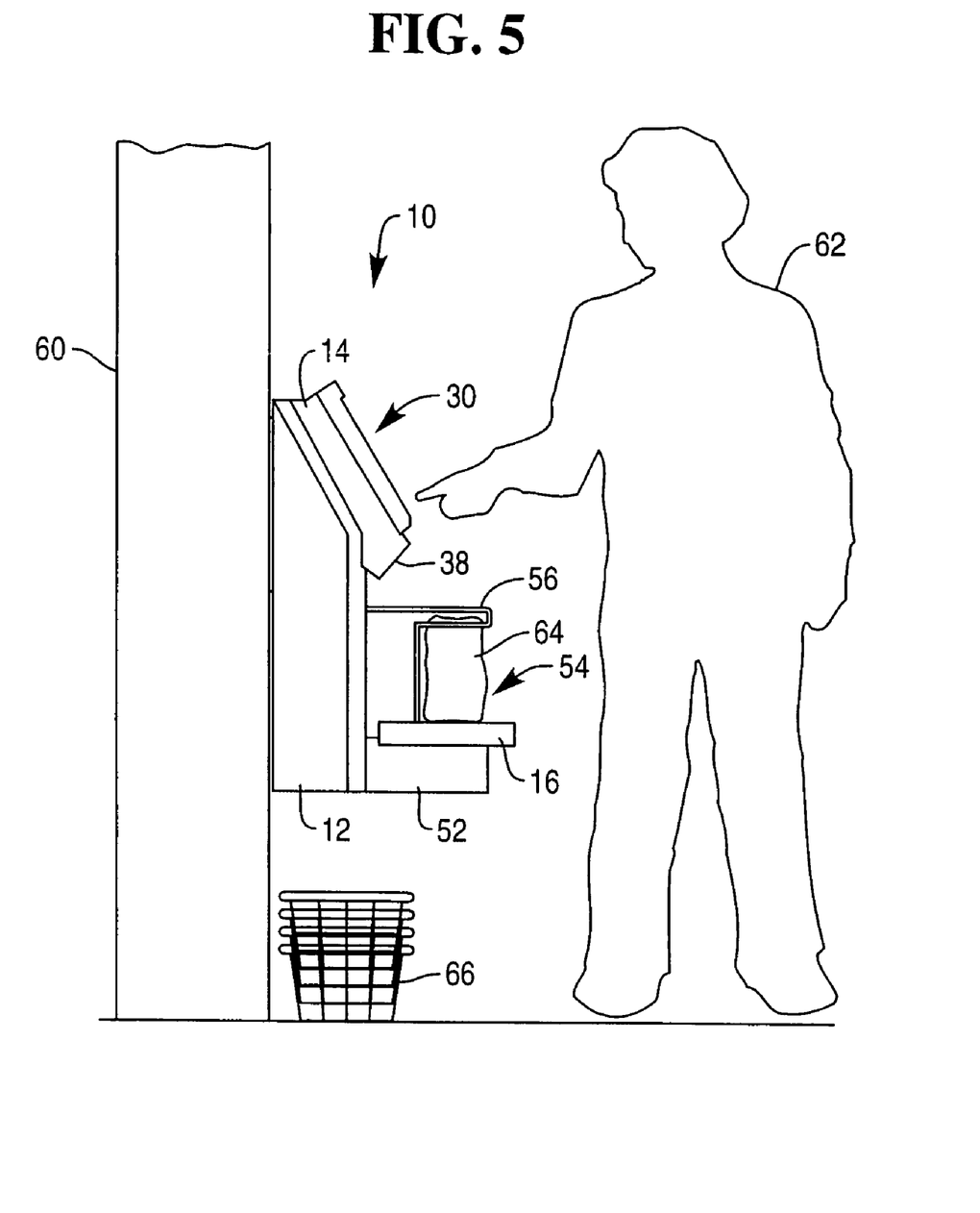
FIG. 5 is a side plan view of the of self-checkout of FIGS. 3 and 4 mounted to a support and being used by a customer.

In FIG. 5, the SCO system 10 of FIGS. 3 and 4 is shown mounted onto a column 60. The column 60 is representative of a pillar, support, post, and/or the like. The SCO system 10 is mounted onto the column 60 so as to provide a zero-footprint self-checkout. This allows shopping baskets 66 to be stored thereunder. The SCO system 10 is mounted on the column at a height that is conducive for a customer 62 to easily use the SCO system 10.

As depicted in FIG. 5, a customer 62 is shown using the SCO system 10. A bag 64 has been placed on the scale 16 that has an item or items therein since scanning has taken place. The customer 62 is about to begin the payment process in conjunction with the ICIT 14. The scale 16 is obtaining a weight of the bag 64. The bagging area 54 is configured such that the bag 64 and its contents (items scanned for purchase) rest upon the security scale 16. The security scale 16 is a weight scale that monitors the weight of items placed into a bag located in the bagging area 54. Such monitoring during a checkout transaction is particularly useful to prevent improprieties during the checkout transaction.

Particularly, the security scale 16 is utilized to monitor the ingress and egress of items into and out of the bagging area 54 (the bag 64). More particularly, the security scale 16 is utilized to detect placement of items into and out of the bag 64. Such item movement monitoring may be utilized to determine if the customer is unintentionally or intentionally committing an impropriety such as theft. For example, a control signal is generated when the scanner 38 successfully captures a product code associated with an item being entered into the SCO system 10. The security scale 16 may be used to detect placement of an item into the bagging area 54 before being scanned by the scanner 38. Moreover, when an item is scanned with the scanner 38 and thereafter placed into the bag 64 in the bagging area 54, the detected weight of the item (as detected by the security scale 16) may be compared to a known weight value of the item that is stored in a database in order to confirm that a different, more expensive item was not substituted for the scanned item. It should be appreciated that the database may be in the form of a master database that includes every item sold by the retailer, or may be a "transaction level" database that is constructed locally at the SCO system 10 during operation thereof.

As illustrated in FIG. 5, the SCO system 10 is preferably mounted on the column 60 so that the scale shelf 52, and thus the scale 16, is approximately at an average knee height of an average customer. This puts the ICIT 14 at an approximately average midsection to chest height for the average customer. The also provides a zero footprint.

Figure 6:
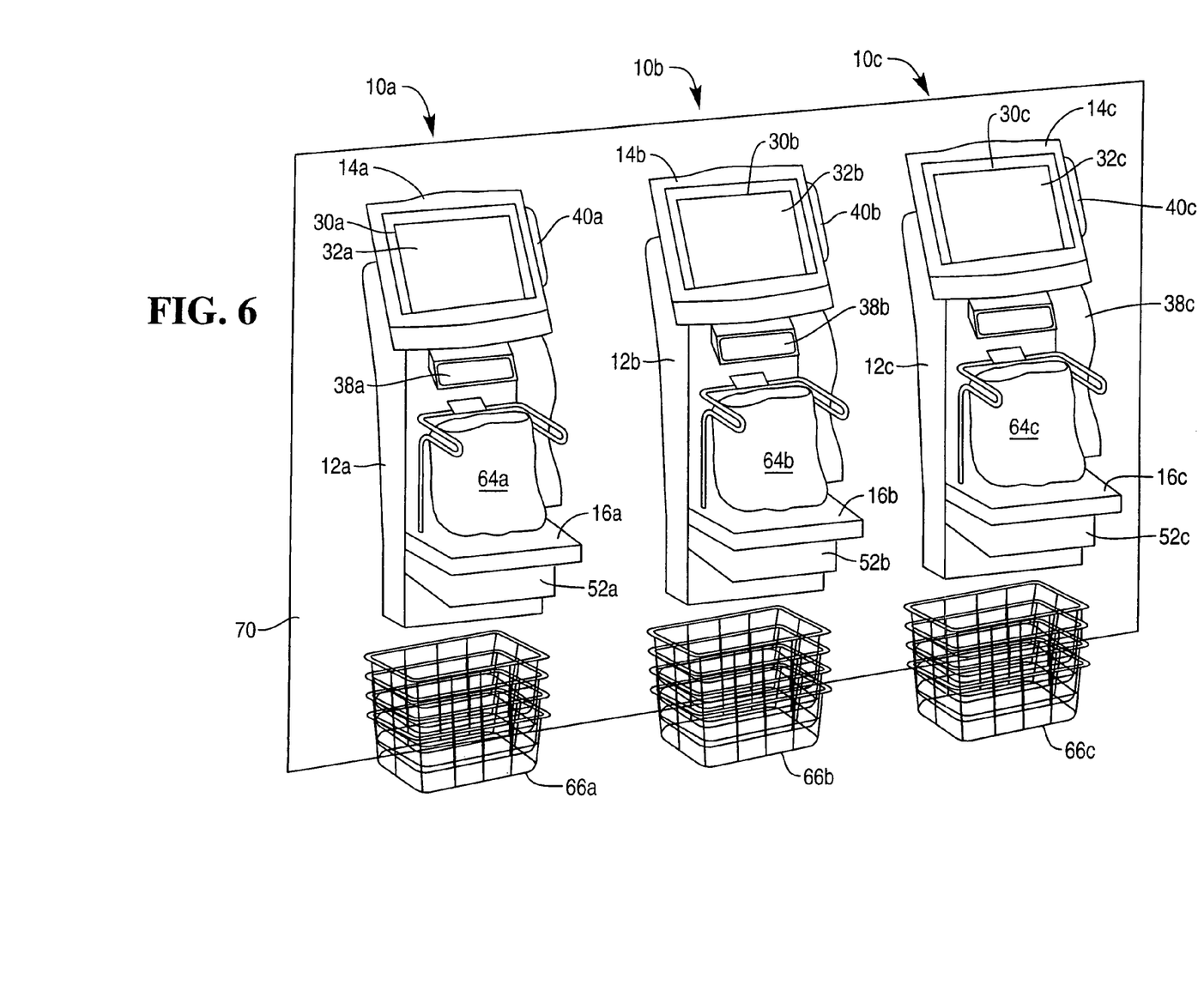
FIG. 6 is a front perspective view of a plurality of self-checkouts of FIGS. 3 and 4 mounted to a wall.

Referring to FIG. 6, there is depicted three SCO systems 10a, 10b, and 10c mounted onto a wall 70. The SCO systems 10a, 10b, and 10c, are essentially identical although each system may be configured differently, in terms of software and/or hardware. Two SCO systems 10a and 10b, for example, may provide information in English, while the SCO system 10c may provide information in Spanish. While not shown, one SCO system, 10b for example, may incorporate the cash module 22 (see FIG. 1). Of course, other configurations are possible and contemplated.

It should be appreciated that the various SCO systems 10a, 10b, and 10c may each be mounted to the wall 70 at different heights. This allows an SCO system to be handicapped (e.g. wheelchair) accessible by lowering the mounting height. As an additional example, one SCO system 10 may be mounted on the wall 70 at a higher than average (normal) height to accommodate taller customers. In all cases, the SCO system 10 of FIGS. 3-6 provides an exemplary embodiment of a zero footprint SCO system.

Figure 7:
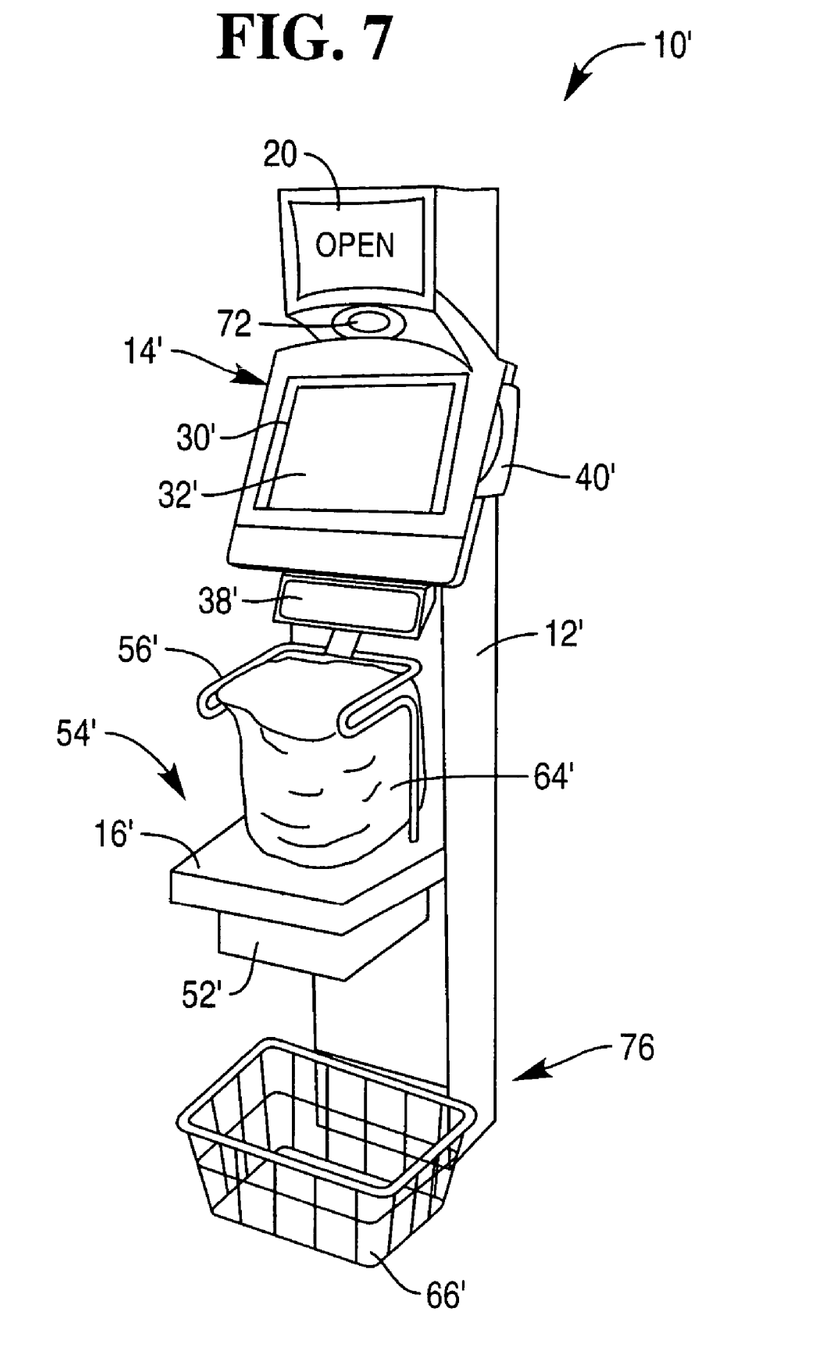
FIG. 7 is a side perspective view of another exemplary embodiment of a self-checkout in accordance with the principles of the subject invention.
Figures 8, 9:
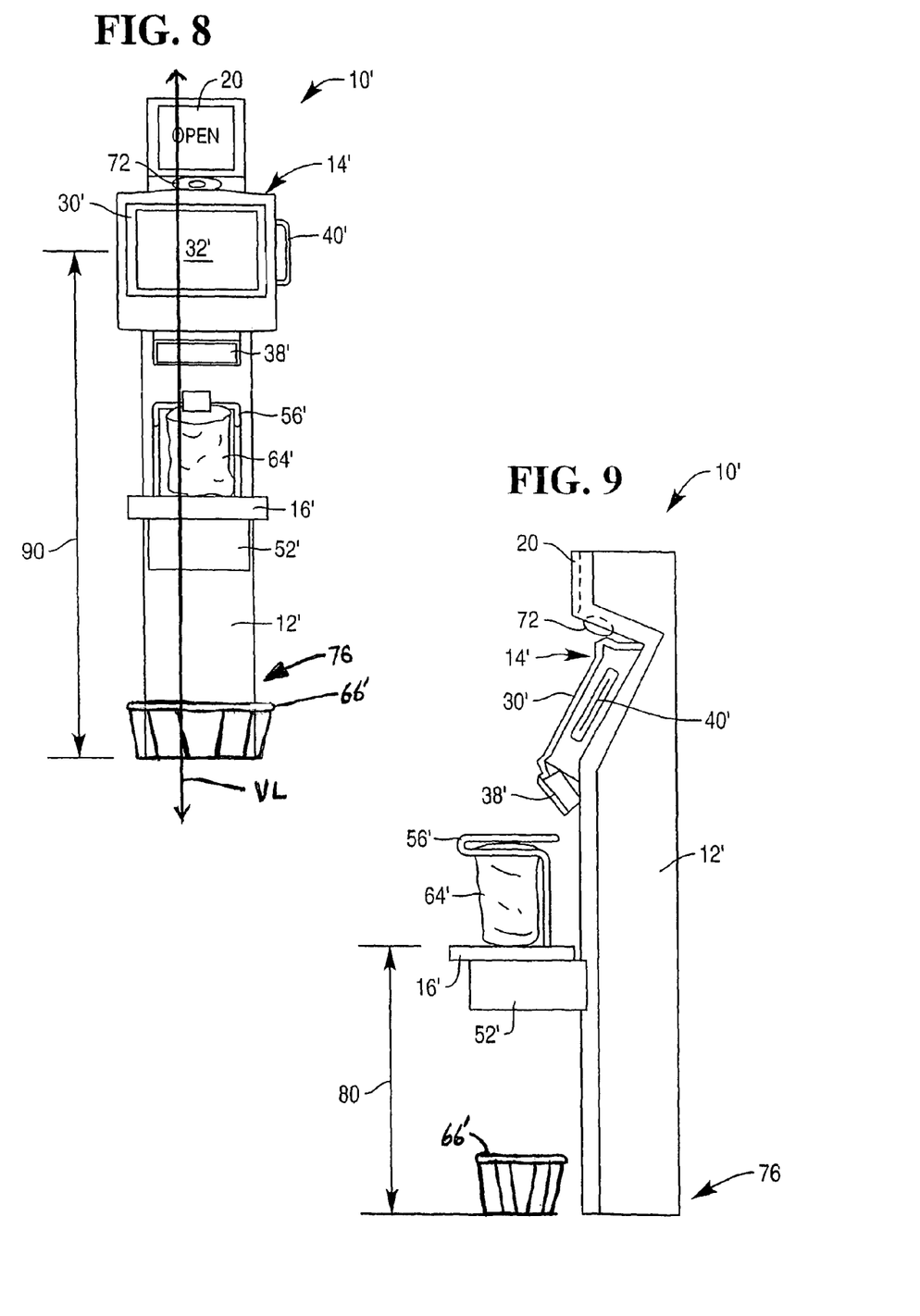
FIG. 8 is a front plan view of the self-checkout of FIG. 7.
FIG. 9 is a side plan view of the self-checkout of FIGS. 7 and 8.

Referring to FIGS. 7-9, there is depicted another exemplary embodiment of a self-checkout (SCO) system generally designated 10'. The SCO system 10' includes the same components as the exemplary embodiment of the SCO system 10 of FIGS. 3-6, and the general block diagrams of FIGS. 1 and 2. Thus, the SCO system 10' includes an ICIT 14' with the associated scanner 38' and card reader 40', a scale 16' supported by a scale shelf 52', and a housing 12'. The housing 12' is formed by an elongated, vertically oriented body that supports the various components in the same or similar manner as the housing 12 of the SCO system 10 of FIGS. 3-6. The housing 12' forms a stand or support that is free standing. The housing 12' has a base 76 that is configured to provide a small footprint for the freestanding SCO system 10'. The base 76 may be approximately one square foot. The exact dimensions and configuration of the base 76 may be changed so long as a small footprint is achieved and the SCO system 10' is free standing. It should be appreciated that other components not particularly described in connection with the SCO system 10' of FIGS. 7-9 that have been described herein in connection with other self-checkouts are similar and thus denoted by a prime ("'") adjacent to the number.

In accordance with an aspect of the subject invention, the SCO system 10' also includes a camera 72 as part of the video monitoring 18 (see FIG. 1). The camera 72 is mounted on the housing 12' or ICIT 14' in a position to capture at least one if not all of the areas of the SCO system 10'. Particularly, the camera 72 is oriented to obtain video of the customer during the purchase transaction. The camera 72 is also preferably oriented to view the display/monitor 30' and associated touch-screen 32'. As well, the camera 72 is also preferably oriented to view the bagging area 54'. In any and all cases, the camera 72 is operative to obtain still pictures and/or video of a purchase transaction or a portion thereof for various reasons such as security, record keeping, and the like. The camera 72 may also provide video conferencing if appropriate.

Additionally, the SCO system 10' includes the use or status mode indicator 20 to provide an indication of whether or not the SCO system 10' is in use. The status mode indicator 20 may be a light, a sound generator, or the like that provides a state indication (use or non-use). The status mode indicator 20 may utilize a proximity sensor (not shown) to determine whether there is a customer in proximity to the housing 12'. The status mode indicator 20 may also actuate or de-actuate in response to an action taking place with respect to a component of the SCO system 10' such as an item being scanned by the scanner 38' or the touch screen 32' being used. The status mode indicator 20 may then change state after a predetermined period of time or after a particular event. Such a signal may be provided to a remote location utilizing the network/communications module 42. In these manners, the status mode indicator 20 relates to a store personal that the SCO system 10' is in use. This may trigger a need for security monitoring utilizing the camera 72 (video module 18) or other monitoring techniques.

Referring specifically to FIGS. 8 and 9, the housing 12' is configured to provide a small footprint for the SCO system 10'. Additionally, the housing 12' is configured to support the various components of the SCO system 10' at convenient heights. It has been determined that a convenient height for the scale 16' (designated by the arrow 80) is approximately two feet (2') or twenty-four inches (24"). This height puts the scale 16' of the SCO system 10' at approximately the knees of an average customer. It has also been determined that a convenient height for the interactive customer interface terminal 14' (designated by the arrow 90) is approximately four feet (4') or forty-eight inches (48"). The heights may vary, but should be within ergonomically compatible positions. Again, the ICIT 14' and the scale 16' are vertically oriented with respect to each other and to the housing 12' (as well as the other components thereof).

Also, as can be clearly seen in FIG. 8, the ICIT 14', the scanner 38', the bag retainer 56', the bag 64', the scale assembly 16', 52', and the basket 66 are positioned in relation to each other such that, when the self-checkout system 10' is viewed in a front elevational view, a vertical line VL intersects the ICIT 14', the scanner 38', the bag retainer 56', the bag 64', the scale assembly 16', 52', and the basket 66'.

It should be appreciated that the various features, functions, and/or components described in connection with the various embodiments are not specific to the particular embodiment but have been shown in separate embodiments to best illustrate the features, functions, and/or components. Therefore, the various features, functions, and/or components may be combined with one another to achieve an SCO system with features, functions, and/or components that are different than the SCO systems pictured and/or described herein.

While this invention has been described as having a preferred design, the subject invention can be further modified within the spirit and scope of this disclosure. This application is therefore intended to cover any variations, uses, or adaptations of the subject invention using its general principles. Further, this application is intended to cover such departures from the present disclosure as come within known or customary practice in the art to which this invention pertains and that fall within the limits of the appended claims.

What is claimed is:

1. A self-checkout system, comprising:
    a vertical support member;
    a user interface attached to said vertical support member, said user interface including (i) a user input device operative to receive input from a user during operation of the self-checkout system, and (ii) a display device operative to display retail information to the user during operation of the self-checkout system;
    a scanner positioned vertically below said user interface;
    a bag retainer positioned vertically below said scanner and defining a bag space;
    a scale assembly attached to said vertical support member and positioned vertically below said bag retainer, said scale assembly including an item support surface,
    wherein said user interface, said scanner, said bag retainer, and said scale assembly are positioned in relation to each other such that, when said self-checkout system is viewed in a front elevational view, a vertical line intersects said user interface, said scanner, said bag retainer, and said scale assembly.

2. The self-checkout system of claim 1, further comprising a bag retained by said bag retainer and positioned in said bag space.

3. The self-checkout system of claim 1, further comprising a basket positioned in said basket space and configured to receive retail items therein.

4. The self-checkout system of claim 1, further comprising a mode indicator operative to display use status of the self-checkout system,
    wherein said mode indicator, user interface, said scanner, said bag retainer, and said scale assembly are positioned in relation to each other such that, when said self-checkout system is viewed in a front elevational view, a vertical line intersects said mode indicator, said user interface, said scanner, said bag retainer, and said scale assembly.

5. The self-checkout system of claim 4, further comprising a security camera operative to generate an image of the user,
    wherein said security camera, said mode indicator, user interface, said scanner, said bag retainer, and said scale assembly are positioned in relation to each other such that, when said self-checkout system is viewed in a front elevational view, a vertical line intersects said security camera, said mode indicator, said user interface, said scanner, said bag retainer, and said scale assembly.

6. The self-checkout system of claim 1, further comprising a basket positioned in a basket space located vertically below said shelf and configured to receive retail items therein,
    wherein user interface, said scanner, said bag retainer, said scale assembly, and said basket are positioned in relation to each other such that, when said self-checkout system is viewed in a front elevational view, a vertical line intersects said user interface, said scanner, said bag retainer, said scale assembly, and said basket.

7. The self-checkout system of claim 1, wherein said user input device includes a touch screen input device.

8. The self-checkout system of claim 1, wherein said scanner is at least partially supported by said user interface.

9. The self-checkout system of claim 1, wherein said bag retainer is supported on said scale assembly.

10. The self-checkout system of claim 1, wherein:
    said user interface is positioned at a first vertical height of approximately four feet, and
    said scale assembly is positioned at a second vertical height of approximately two feet.

* * * * *